UNITED STATES PATENT OFFICE.

PETER PRESCOTT, OF BOONEVILLE, NEW YORK.

IMPROVED COMPOSITION FOR VARNISH, &c.

Specification forming part of Letters Patent No. 46,024, dated January 24, 1865.

*To all whom it may concern:*

Be it known that I, PETER PRESCOTT, of Booneville, in the county of Oneida and State of New York, have invented a new and Improved Composition for Varnish, Paint, &c.; and I do hereby declare that the following is a full, clear, and exact description thereof, which will enable others skilled in the art to fully understand and use the same.

This invention consists in a composition for varnish, paint, &c., in which shellac forms the base or principal ingredient, with other materials combined as hereinafter stated.

The ingredients which I use for my composition are a solution of borax in water, shellac, isinglass, and, if desired, a small quantity of white vitriol may be added. The proportion in which these ingredients are mixed together is about as follows: water, two quarts; borax, four ounces; shellac, one pound; isinglass, one-half ounce; and, if desired, white vitriol, one-quarter ounce. In order to mix these ingredients together, I bring the water and shellac together to the boiling-heat, and then add the borax, finely pulverized. When all is dissolved and the boiling has stopped I add the isinglass, which is previously dissolved in as little water as possible, and while cooling add the white vitriol. Stir it rapidly for two or three minutes, and strain through a sieve. The shellac is to make a hard and smooth surface, and the isinglass is added to make the composition adhere to whatever it may be applied. The vitriol is to clarify the composition and to render it transparent quicker when exposed to the light. It is unnecessary to add the same unless it is desired to obtain a transparent varnish or sizing for paper, pictures, &c., and it serves also to separate the borax from the liquid. When vitriol is not used there will be no need of straining the liquid.

This composition is much cheaper than shellac dissolved in alcohol. It makes a much smoother surface, and benzine varnish can be laid on without curdling. Neither is it liable to crack. Furthermore, it can be kept without evaporating, as alcohol does, and it is perfectly safe to be used in all places and at all times, whereas alcohol is unsafe to use in the evening with open lights, and it is also very disagreeable in a tight and warm room, as finishing-rooms have to be in winter. Finally, my composition dries quickly, and in using it no delay is caused by the time required for drying.

I claim as new and desire to secure by Letters Patent—

A composition for varnishing, painting, &c., made of the ingredient sherein specified, and mixed together substantially in the manner and about in the proportion set forth.

PETER PRESCOTT.

Witnesses:
JOSEPH OWENS,
STEPHEN MANCHESTER.